(12) United States Patent
    Wang

(10) Patent No.: US 8,205,222 B2
(45) Date of Patent: Jun. 19, 2012

(54) PORTABLE OPTICAL DISC PLAYER FOR FIXING TRAVERSE MODULE THEREOF

(75) Inventor: He-Li Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/893,004

(22) Filed: Sep. 29, 2010

(65) Prior Publication Data

US 2012/0023512 A1    Jan. 26, 2012

(30) Foreign Application Priority Data

Jul. 26, 2010    (CN) .......................... 2010 1 0236829

(51) Int. Cl.
    *G11B 17/03*    (2006.01)

(52) U.S. Cl. ...................................... 720/692
(58) Field of Classification Search .................. 720/692
    See application file for complete search history.

(56) References Cited

U.S. PATENT DOCUMENTS

| 5,214,549 A * | 5/1993 | Baker et al. ................. 360/97.02 |
| 5,666,239 A * | 9/1997 | Pottebaum ................... 360/97.03 |
| 5,875,067 A * | 2/1999 | Morris et al. ............... 360/97.01 |
| 6,510,021 B1 * | 1/2003 | Woldemar et al. ......... 360/97.01 |
| 7,428,122 B2 * | 9/2008 | Kimura et al. ............. 360/97.03 |
| 2001/0055179 A1 * | 12/2001 | Morris et al. ............. 360/97.01 |
| 2005/0141136 A1 * | 6/2005 | Kitamura ................... 360/99.08 |
| 2006/0034010 A1 * | 2/2006 | Abe et al. .................. 360/97.02 |
| 2006/0277561 A1 * | 12/2006 | Mao et al. ...................... 720/692 |
| 2007/0002489 A1 * | 1/2007 | Abe ........................... 360/97.01 |

* cited by examiner

*Primary Examiner* — David D Davis
(74) *Attorney, Agent, or Firm* — Altis Law Group, Inc.

(57) ABSTRACT

A portable optical disc player includes a housing having a top casing and a bottom casing, a traverse module, a plurality of first fixing members, and a plurality of fasteners. The traverse module is configured for reading information from, or writing information to, a disc and disposed (or sandwiched) between the top casing and the bottom casing. The plurality of first fixing members is mounted on the interior surface of one of the top casing and the bottom casing. The plurality of fasteners extends through the other of the top casing and the bottom casing, and is received in the plurality of first fixing members respectively so as to fix the top casing and the bottom casing together. Thus, the traverse module is firmly clamped by the top casing and the bottom casing accordingly.

17 Claims, 7 Drawing Sheets

PORTABLE OPTICAL DISC PLAYER FOR FIXING TRAVERSE MODULE THEREOF

BACKGROUND

1. Technical Field

The present disclosure relates to electronic devices, and particularly to a portable optical disc player.

2. Description of Related Art

A frequently used portable optical disc player, such as a portable digital versatile disc (DVD) player, includes a housing, a traverse module received in the housing, and a plurality of fasteners for fixing the traverse module inside the housing by passing through the traverse module. However, under restrictions of space of the traverse module, thickness of the fasteners is limited, such that they are easily cracked when the portable optical disc player is in motion. Thus, lifetime of the fasteners is decreased and the traverse module may be easily misaligned.

Therefore, there is room for improvement in the art.

BRIEF DESCRIPTION OF THE DRAWINGS

The components of the drawings are not necessarily drawn to scale, the emphasis instead placed upon clearly illustrating the principles of the embodiment of a portable digital versatile disc player. Moreover, in the drawings, like reference numerals designate corresponding parts throughout the views.

DETAILED DESCRIPTION

Embodiments of the present disclosure will now be described in detail with reference to the drawings.

Figure 1:
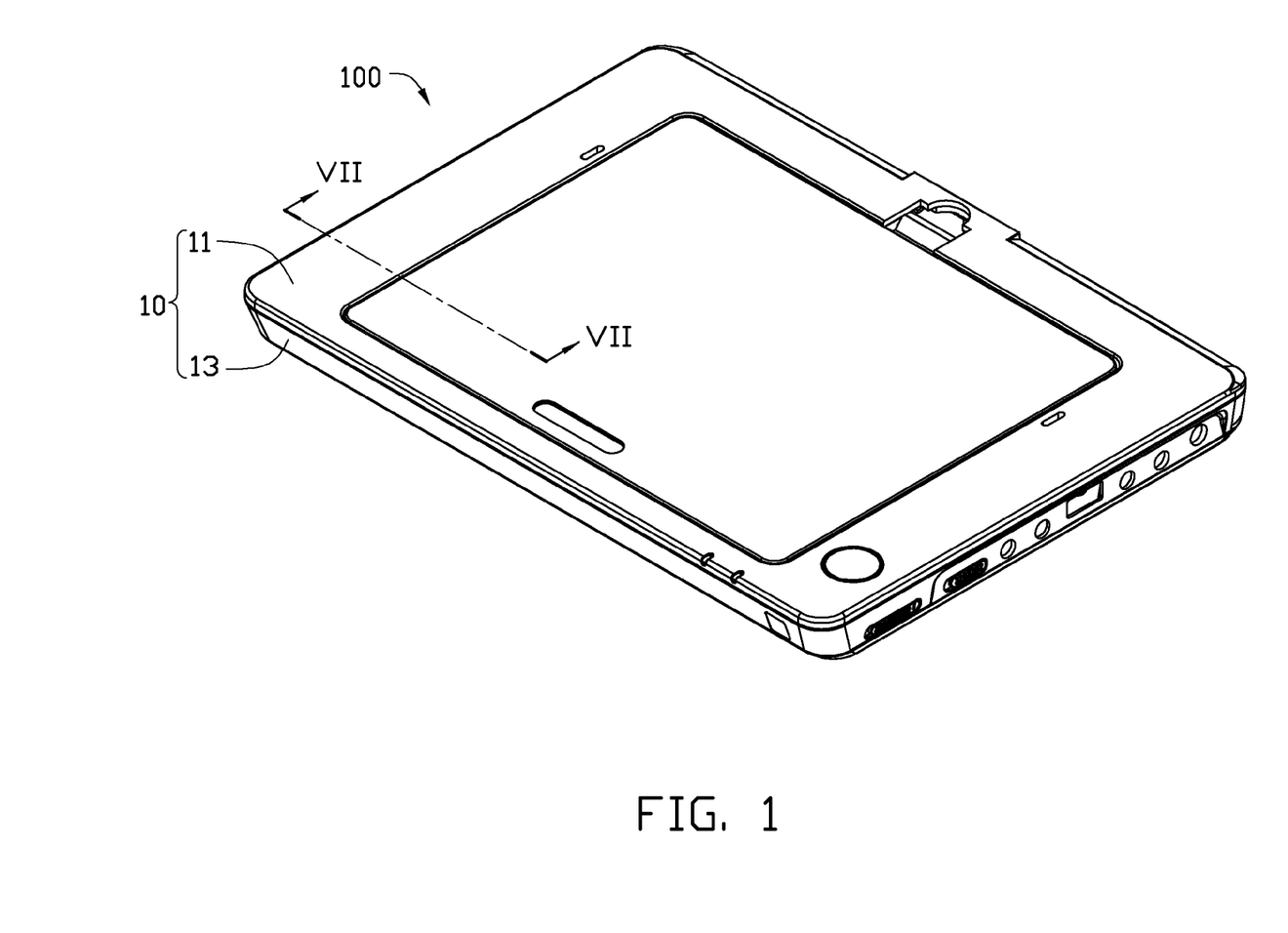
FIG. 1 is an isometric, schematic view of a portable optical disc player according to an exemplary embodiment.
Figure 2:
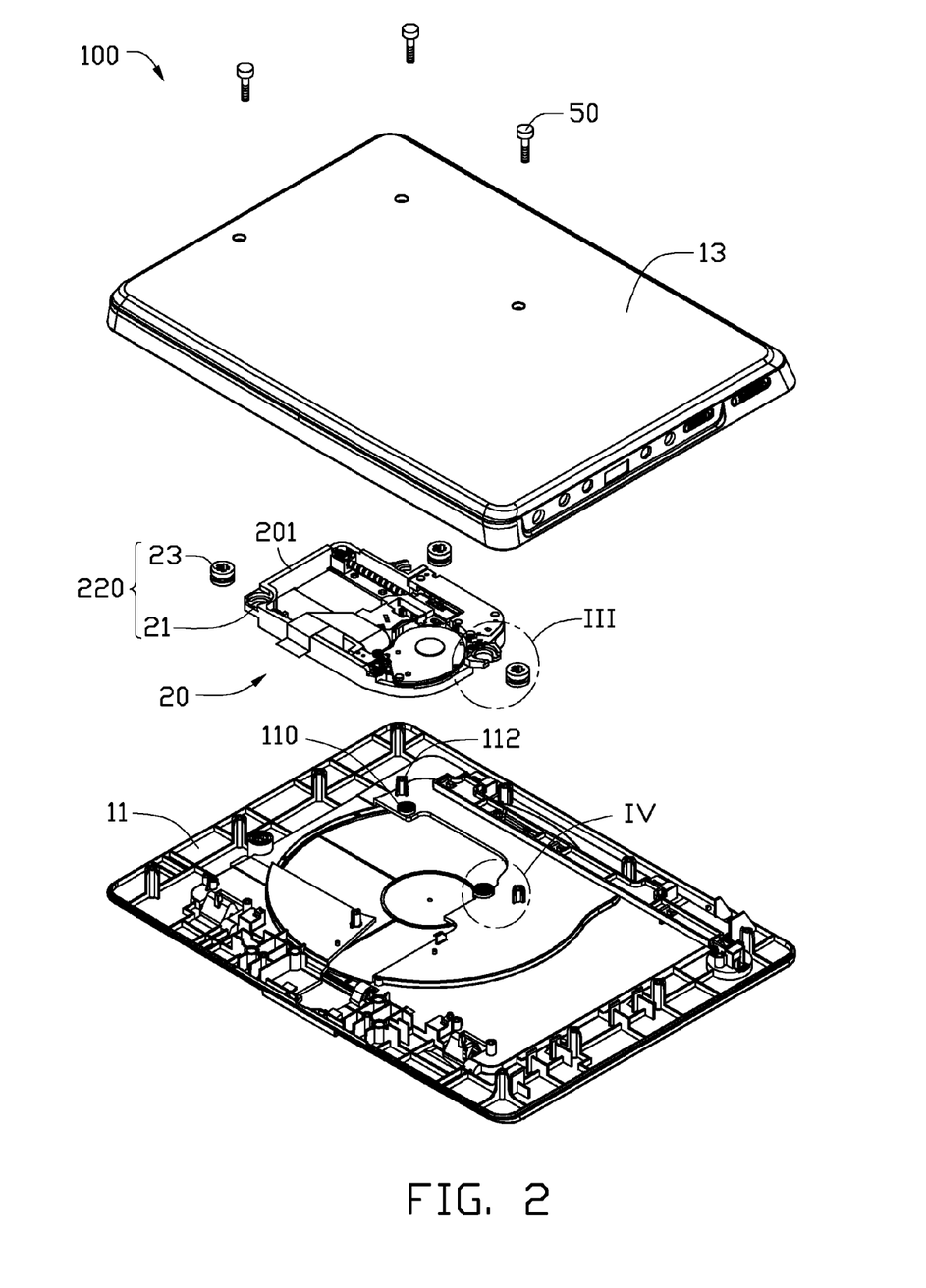
FIG. 2 is an exploded view of FIG. 1.

Referring to FIGS. 1 and 2, a portable optical disc player 100 according to an exemplary embodiment is illustrated. In this embodiment, the portable optical disc player 100 includes a housing 10, a traverse module 20 received in the housing, and a plurality of fasteners 50. In the embodiment, the portable optical disc player 100 is a portable digital versatile disc (DVD) player.

Figure 3:
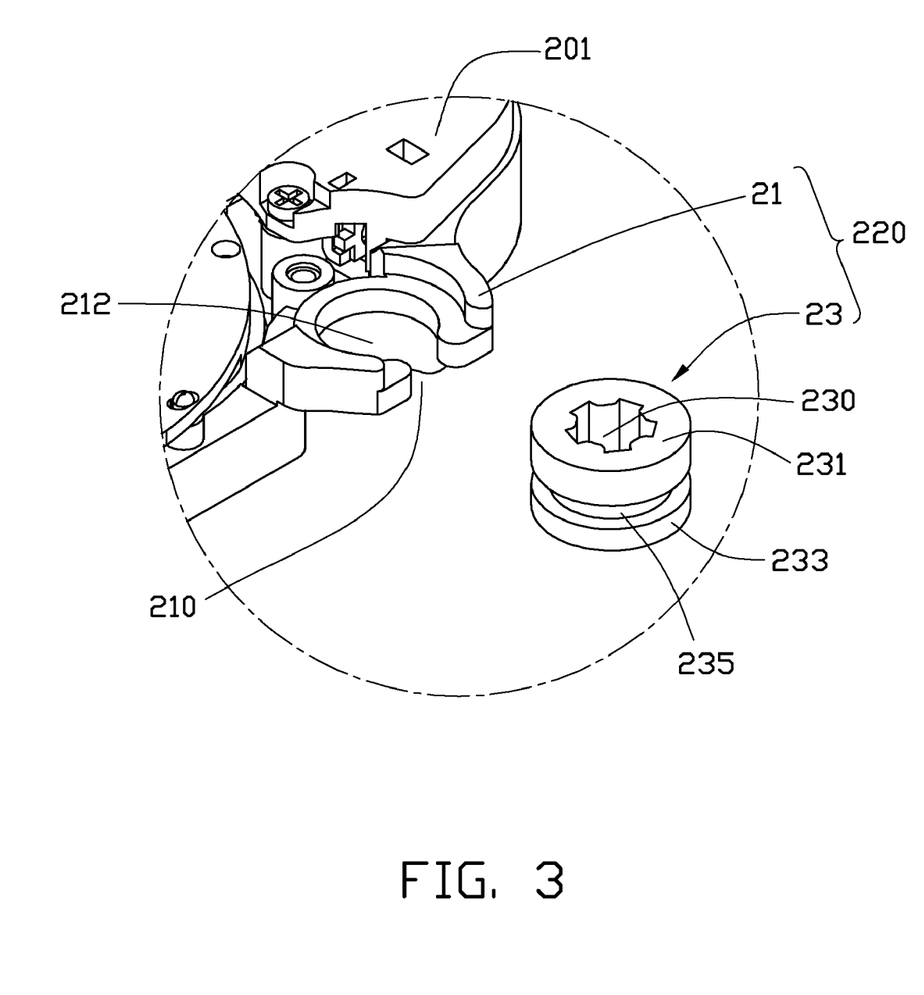
FIG. 3 is an enlarged view of a circled section III of FIG. 2.

Referring to FIGS. 2 and 3, the traverse module 20 is configured for reading information from, or writing information to a disc. The traverse module 20 includes a body 201 and three damping assemblies 220 mounted on the body 201. Each damping assembly 220 includes a clamp 21 and an elastic damper 23 held by the clamp 21.

The damper 23 provides antivibration stability when it is loaded. The damper 23 is elastic material, such as rubber. The damper 23 includes a first end 231, a second end 233 opposite to the first end 231, and a connecting part 235 connecting the first end 231 and the second end 233. The diameters of the first end 231 and the second end 233 are the same, and greater than that of the connecting part 235. The damper 23 defines a perforation 230 through the first end 231, the connecting part 235, and the second end 233.

The clamp 21 is used for holding the damper 23. The clamp 21 laterally extends out from sides of the body 201 and is coplanar to the body 201. The clamp 21 defines a gap 210 and a first through hole 212 communicating with the gap 210. The first through hole 212 is through the clamp 21 perpendicular to the body 201. The gap 210 is defined on exterior surface of the clamp 21 to communicate with the first through hole 212.

The gap 210 provides a passage for the connecting part 235 of the damper 23. The first through hole 212 receives the connecting part 235. For example, when the connecting part 235 is pushed into the gap 210, the connecting part 235 is deformed to slide into the first through hole 212. Then the connecting part 235 is received in the first through hole 212, and the first end 231 and the second end 233 are positioned on two opposite sides of the clamp 21, that is, the clamp 21 is sandwiched between the first end 231 and the second end 233. Thus, the clamp 21 holds the damper 23.

Referring to FIG. 2 again, the housing 10 includes a top casing 11 and a bottom casing 13. The top casing 11 is coupled to the bottom casing 13 to define a chamber 15 (see FIG. 5). The chamber 15 receives the traverse module 20.

The top casing 11 includes three first position pins 110 and three first fixing columns 112 respectively adjacent thereto. The first position pin 110 and the first fixing column 112 depend from the interior surface of the top casing 11 perpendicular to the body 201. The number of first position pins 110 is equal to that of the first fixing columns 112, and also to that of the dampers 23. The three first position pins 110 are respectively received in the three perforations 230 of the three dampers 23 from the upper side of the three dampers 23 when the portable optical disc player 100 is assembled, such that the position of the traverse module 20 relative to the housing 10 in the lateral direction is fixed.

Figure 4:
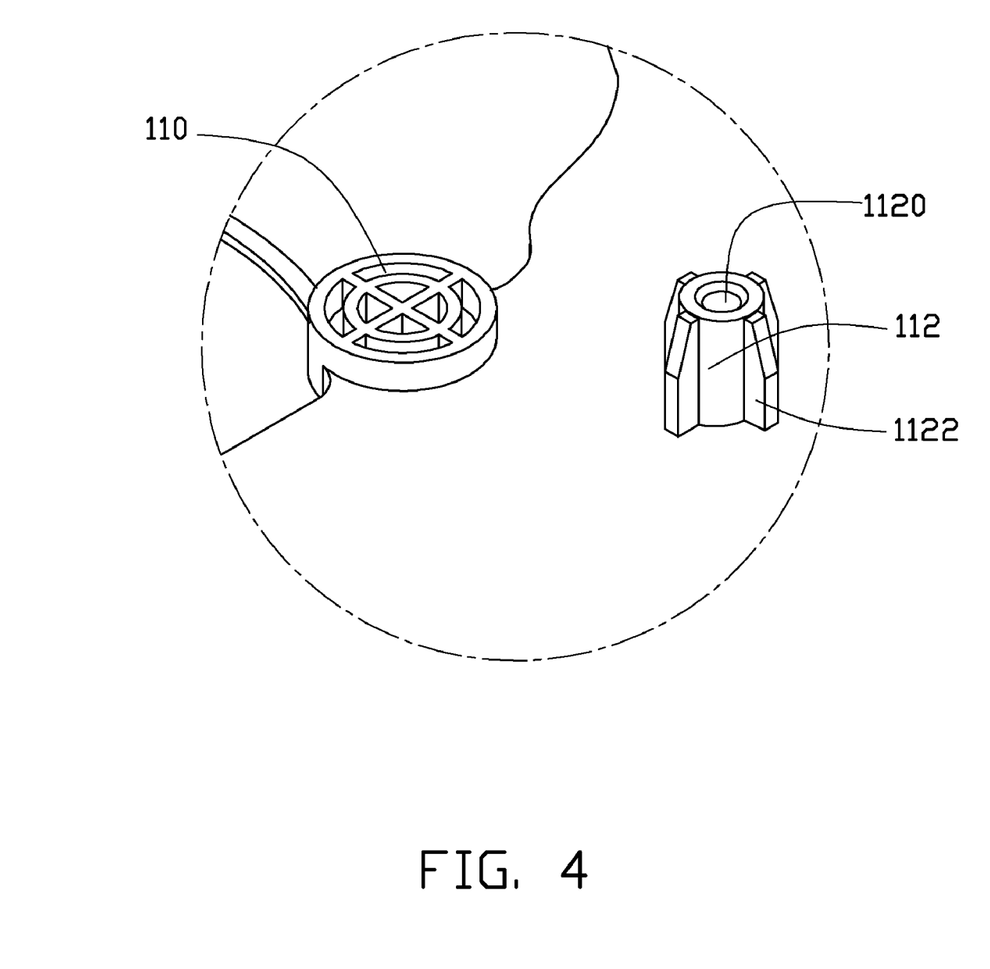
FIG. 4 is an enlarged view of a circled section IV of FIG. 2

Further referring to FIG. 4, the first position pins 110 may be cylindrical, and define several recesses (not labeled) on an end thereof. The first fixing column 112 may also be cylindrical, and defines a second through hole 1120 extending perpendicular to the body 201. In this embodiment, there are several ribs 1122 surrounding the first fixing column 112, enhancing the strength thereof.

Figure 5:
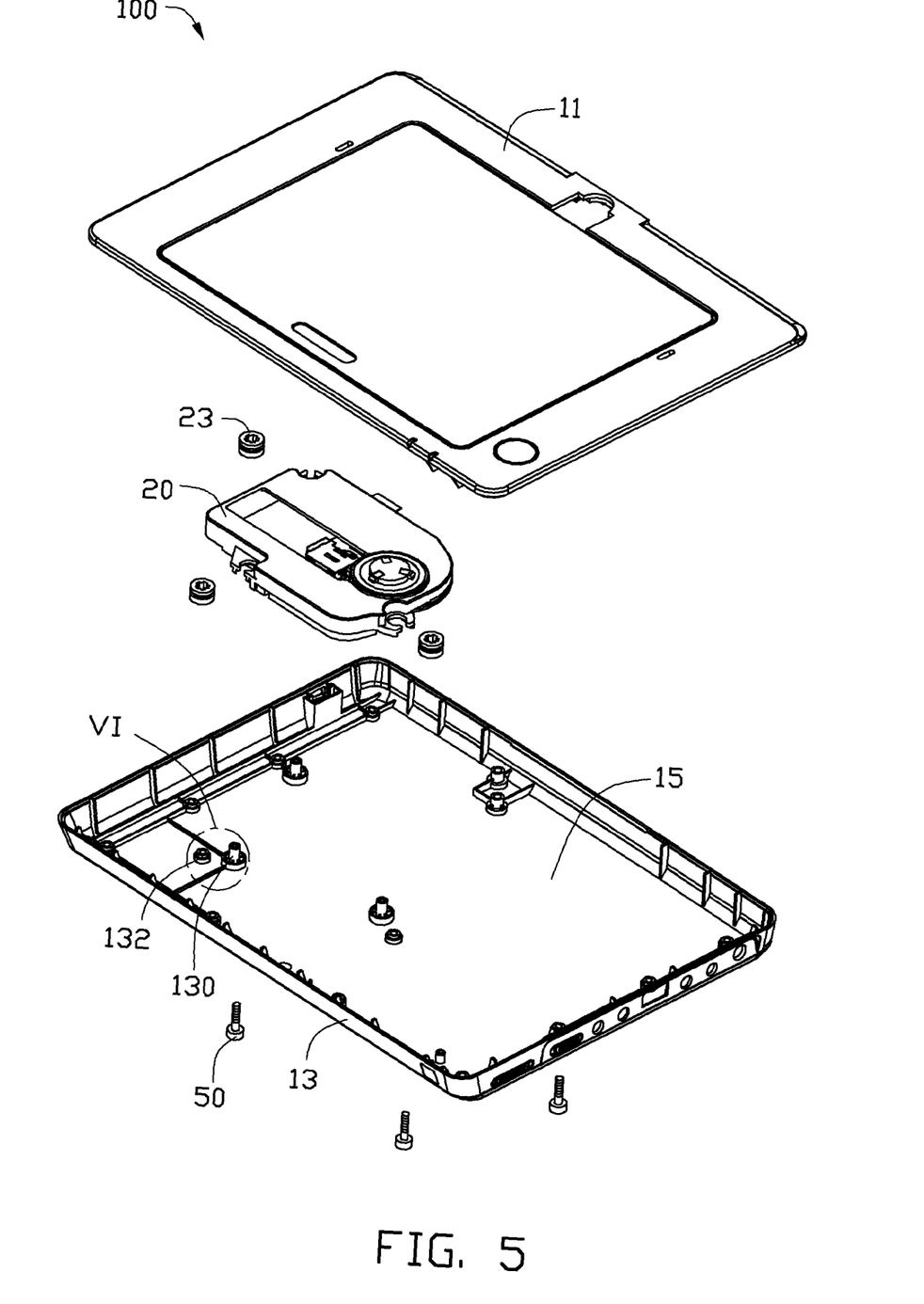
FIG. 5 is similar to FIG. 2, but shows the portable optical disc player from another viewing angle.

Referring to FIG. 5, the bottom casing 13 includes three second position pins 130 and three second fixing columns 132 adjacent to the three second position pins 130 respectively. The second position pin 110 and the second fixing column 132 extend upwardly from the interior surface of the bottom casing 13 perpendicular to the body 201. The number of second position pins 130 is equal to that of the second fixing columns 132, and also to that of the dampers 23. The locations of the second fixing columns 132 in the bottom casing 13 respectively correspond to those of the first fixing column 112 in the top casing 11.

The three second position pins 130 are respectively received in the three perforations 230 (see FIG. 3) of the three dampers 23 from the lower side of the three dampers 23 when the portable optical disc player 100 is assembled, such that the position of the traverse module 20 relative to the housing 10 in the lateral direction is fixed. The locations of the second position pins 130 in the bottom casing 13 correspond to those of the first position pins 110 in the top casing 11. When the first position pin 110 and the second position pin 130 are received in the perforation 230 of the damper 23, the first position pin 110 is opposite to the second position pin 130, and a distance is defined between the first position pin 110 and the second position pin 130.

Figure 6:
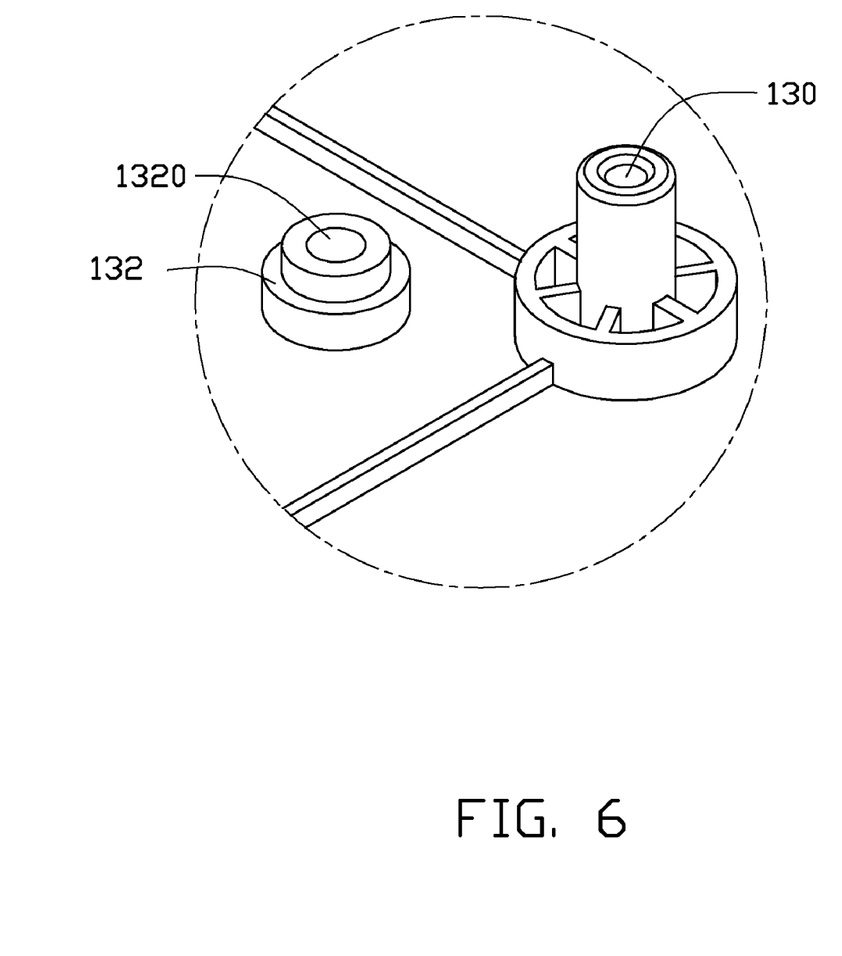
FIG. 6 is an enlarged view of a circled VI of FIG. 5.

Further referring to FIG. 6, the second position pins 110 and the second fixing columns 132 are stepped. The second fixing column 132 and the bottom casing 13 together define a third through hole 1320 therethrough.

Figure 7:
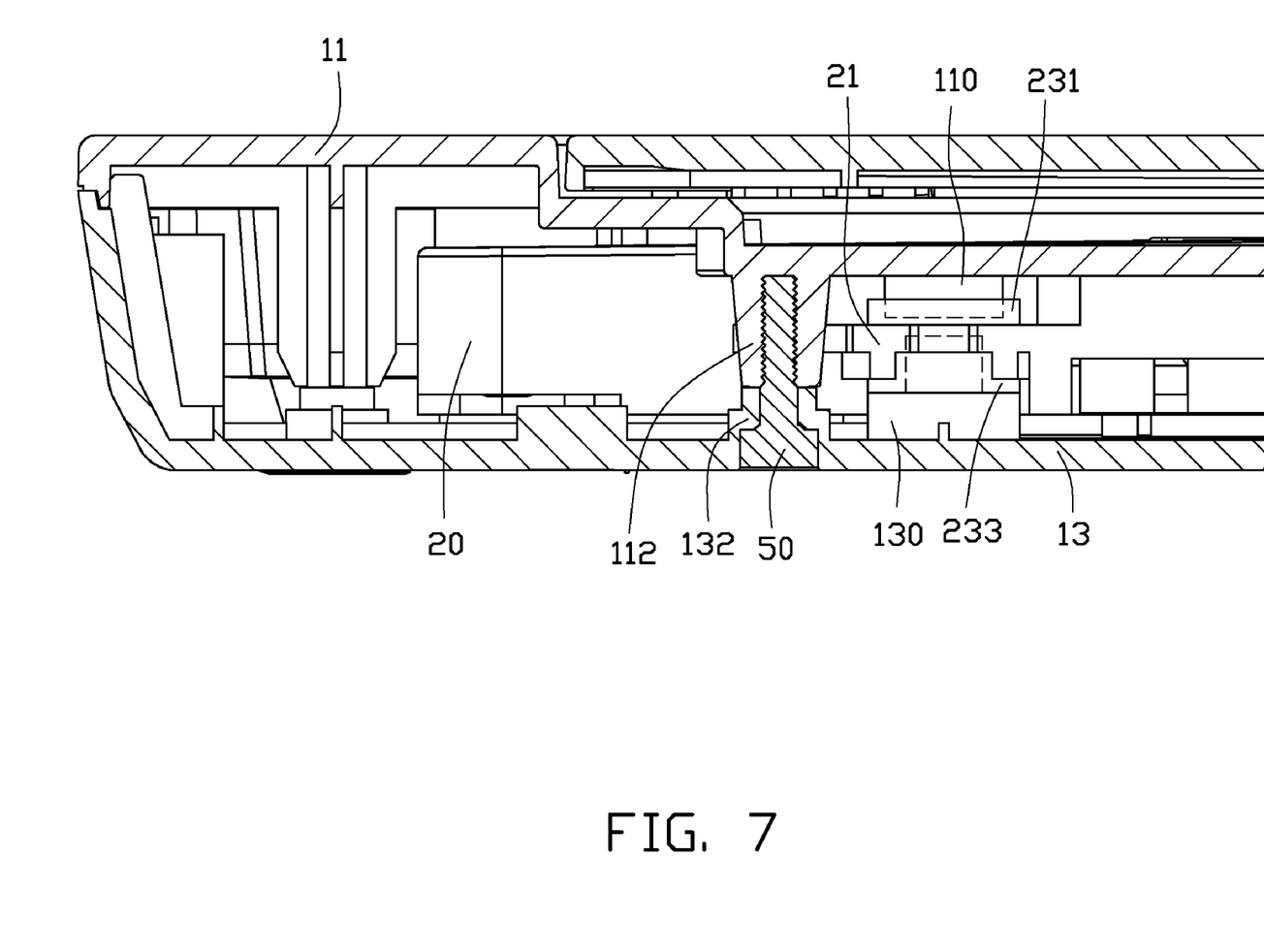
FIG. 7 is a cross-section of the portable optical disc player of FIG. 1 taken along the line VII-VII.

Referring to FIG. 7, when the top casing 11 is coupled with the bottom casing 13, the first position pins 110 are respectively received in the first ends 231 of the dampers 23 and in the perforations 230 of the dampers 23. The second position pins 130 are respectively received in the second ends 233 of the dampers 23 and in the perforations 230 of the dampers 23. Thus, the first position pins 110 and the second position pins 130 position the traverse module 20 on the chamber 15. The first position pin 110 is connected to the second position pin 130 by the damper 23, but the first position pin 110 is moveable relative to the second position pin 130 because of the distance defined between the first position pin 110 and the second position pin 130. Thus, when the portable optical disc player 100 is in motion, the elastic damper 23 cushions the traverse module 20.

When the top casing 11 is coupled to the bottom casing 13, the first fixing columns 112 are respectively opposite to the second fixing columns 132. In this embodiment, the first fixing columns 112 respectively contact the second fixing columns 132. The fasteners 50 are respectively received in the first fixing columns 112 after passing through the bottom casing 13. In this embodiment, the fasteners 50 are screws. Thus, the top casing 11 and the bottom casing 13 firmly clamp the traverse module 20. When the portable optical disc player 100 is in motion, the traverse module 20 is firmly fixed to avoid shifting.

As the first fixing columns 112 and the second fixing columns 132 are independent from the traverse module 20, the traverse module 20 will not affect thickness of the first fixing columns 112 and the second fixing columns 132. The thickness of the first fixing columns 112 and the second fixing columns 132 can be freely designed, as long as the housing 10 can receive them. It is difficult to crack the fasteners 50 as thickness of the fasteners 50 is also increased. Thus the useful life of the fasteners 50 is extended.

In this embodiment, a centre of gravity of the three clamps 21 overlaps that of the traverse module 20. Thus, the traverse module 20 can be easy positioned by the first position pins 110 and the second position pins 130. In other embodiments, the number of clamps 21 can be more than three.

As disclosed, the portable optical disc player 100 uses the first position pins 110 and the second position pins 130 to position the traverse module 20 on the bottom casing 13, and uses the first fixing columns 112 and the second fixing columns 132 to fix the traverse module 20 between the top casing 11 and the bottom casing 13. Thus, the traverse module 20 avoids shifting to ensure dependable performance of the portable optical disc player 100.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. A portable optical disc player, comprising:
   a housing comprising a top casing and a bottom casing;
   a traverse module configured for reading information from, or writing information to, a disc and disposed between the top casing and the bottom casing;
   a plurality of first fixing members mounted on the interior surface of one of the top casing and the bottom casing; and
   a plurality of fasteners extending through the other of the top casing and the bottom casing, and received in the plurality of first fixing members respectively so as to fix the top casing and the bottom casing together, the traverse module firmly clamped by the top casing and the bottom casing accordingly;
   wherein the traverse module comprises a body and a plurality of damping assemblies set on the body, each damping assembly defining a perforation there through, and one of the top casing and the bottom casing comprises a plurality of first position pins respectively received in the plurality of perforations to position the body.

2. The portable optical disc player of claim 1, wherein the plurality of first position pins is adjacent to the plurality of first fixing columns respectively.

3. The portable optical disc player of claim 1, wherein the plurality of fasteners comprises a plurality of screws.

4. The portable optical disc player of claim 1, wherein one of the top casing and the bottom casing defines a plurality of through holes corresponding to the plurality of first fixing columns, and the plurality of fasteners is received in the plurality of first fixing columns after passing through the plurality of through holes.

5. The portable optical disc player of claim 1, wherein each damping assembly comprises a clamp laterally extending out from sides of the body and coplanar to the body, and an elastic damper held by the clamp, wherein the damper provides an antivibration stability when it is loaded.

6. The portable optical disc player of claim 5, wherein the clamp defines a gap and a first through hole communicating with the gap, the first through hole is through the clamp perpendicular to the body, the gap defined on an exterior surface of the clamp.

7. The portable optical disc player of claim 6, wherein the damper is deformed to pass through the gap and received in the first through hole after passing through the gap.

8. The portable optical disc player of claim 7, wherein the damper comprises a first end, a second end opposite to the first end, and a connecting part connecting the first end and the second end, wherein the connecting part is deformed to pass through the gap and is received in the first through hole after passing through the gap, and the first end and the second end are positioned on two opposite sides of the clamp, wherein the clamp is sandwiched between the first end and the second end, the perforation is defined on the damper and through the first end, the connecting part, and the second end.

9. The portable optical disc player of claim 8, wherein diameter of the first end is equal to that of the second end, and exceeds that of the connecting part.

10. The portable optical disc player of claim 1, wherein the other of the top casing and the bottom casing comprises a plurality of second position pins corresponding to the plurality of first position pins, the plurality of second position pins is respectively received in the plurality of perforations to position the body.

11. The portable optical disc player of claim 10, wherein when the first position pin and the second position pin are received in the perforation, and the first position pin is opposite to the second position pin and defines a distance with the second position pin.

12. The portable optical disc player of claim 1, further comprising a plurality of ribs surrounding the outside of the first fixing column, enhancing the strength of the first fixing column.

13. A portable optical disc player, comprising:
a housing comprising:
a top casing; and
a bottom casing corresponding to the top casing;
a traverse module configured for reading information from, or writing information to, a disc and disposed between the top casing and the bottom casing;
a plurality of fasteners independent from the traverse module extending through one of the top casing and the bottom casing and received in the other of the top casing and the bottom casing so as to fix the top casing and the bottom casing together, the traverse module firmly clamped by the top casing and the bottom casing accordingly;
wherein one of the top casing and the bottom casing comprises a plurality of first fixing columns receiving the plurality of fasteners, the other of the top casing and the bottom casing comprises a plurality of second fixing columns corresponding to the plurality of first fixing columns, the plurality of fasteners further received in the plurality of second fixing columns.

14. The portable optical disc player of claim 13, wherein the traverse module comprises a body and a plurality of damping assemblies mounted on the body, each damping assembly defines a perforation through thereof, one of the top casing and the bottom casing comprises a plurality of position pins respectively received in the plurality of perforations to position the body.

15. The portable optical disc player of claim 14, further comprising a plurality of ribs surrounding the outside of the first fixing column, enhancing the strength of the first fixing column.

16. A portable optical disc player, comprising:
a housing comprising a top casing and a bottom casing;
a traverse module configured for reading information from, or writing information to, a disc and disposed between the top casing and the bottom casing;
a plurality of first fixing members mounted on the interior surface of one of the top casing and the bottom casing; and
a plurality of fasteners extending through the other of the top casing and the bottom casing, and received in the plurality of first fixing members respectively so as to fix the top casing and the bottom casing together, the traverse module firmly clamped by the top casing and the bottom casing accordingly;
wherein the other of the top casing and the bottom casing comprises a plurality of second fixing columns corresponding to the plurality of first fixing members, wherein the plurality of fasteners is further received in the plurality of second fixing columns after extending through the other of the top casing and the bottom casing.

17. The portable optical disc player of claim 16, wherein the plurality of second fixing columns defines a plurality of through holes for receiving the plurality of fasteners.

* * * * *